Patented Dec. 9, 1952

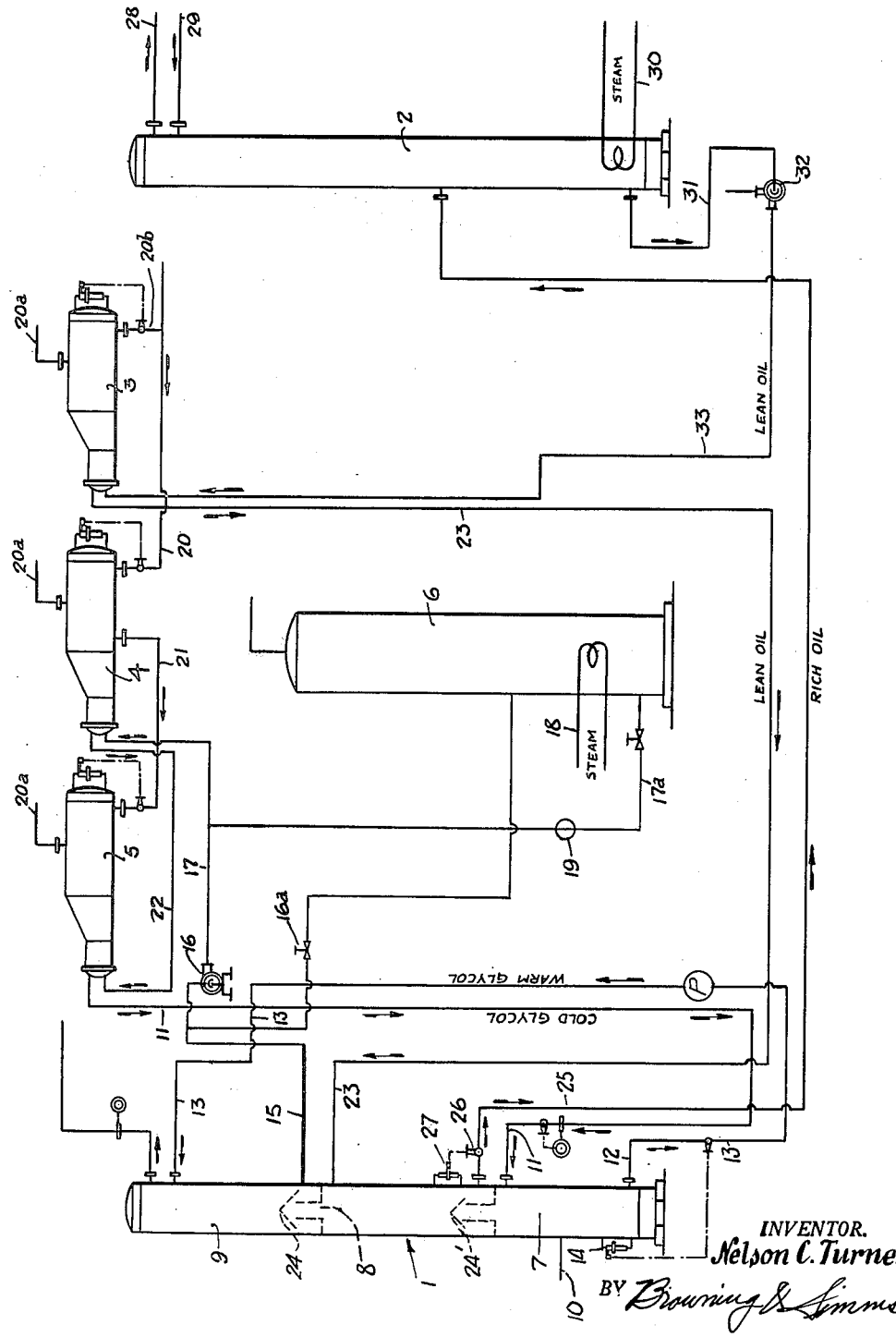

2,620,895

UNITED STATES PATENT OFFICE 2,620,895

SEPARATION AND DEHYDRATION OF HEAVY HYDROCARBONS FROM A GASEOUS MIXTURE

Nelson C. Turner, Houston, Tex., assignor to Hudson Engineering Corporation, Houston, Tex., a corporation of Texas Application March 26, 1949, Serial No. 83,610

7 Claims. (Cl. 183—120)

This invention relates to improvements in the method of separating selected heavy constituents from a gaseous mixture of hydrocarbons and refers more particularly to the absorption method of separation wherein the gas feed stream is dehydrated and chilled and then contacted with an absorbent menstruum.

In absorption separation plants, it is desirable to cool the feed gas before it is contacted with the absorbent medium. Such cooling increases the efficiency of the absorption of the heavy constituents. However, most natural gas contains moisture which upon cooling of the gas causes formation of hydrates or what is commonly referred to as freezing. For this reason, proper cooling of the feed stream has heretofore been impractical where the feed gas contains appreciable quantities of moisture without first dehydrating the gas and this has been done as a separate step which has proven very expensive.

An object of this invention is to provide an economical absorption separation method for hydrocarbon gases containing water vapors wherein the feed gas is simultaneously dehydrated and cooled.

Another object is to provide an absorption separation method wherein the incoming gas feed stream is dehydrated and chilled by contact with a chilled dehydrating liquid.

A further object is to provide an absorption separation process where the feed stream is contacted with a cold dehydrating liquid prior to its contact with the absorbent menstruum, and the humidified dehydrating liquid is contacted with the overhead product from the absorption process to recover refrigeration.

Other and further objects of this invention will appear from its description.

In the accompanying drawings which form a part of the instant specification and which are to be read in conjunction therewith, the single figure is a diagrammatic flow sheet illustrating an embodiment of the invention.

The apparatus shown in the drawings includes an absorber 1, a rich oil rectifier 2, an oil chiller 3, chillers 4 and 5 for cooling a dehydrating liquid and a rectifier or reactivator 6 for reconditioning the dehydrating liquid. The absorber 1 may be divided into a plurality of sections 7, 8 and 9.

The lower section 7 is the section where the feed stream is dehydrated and chilled, the intermediate section 8 is the absorption section and the upper section 9 is the section in which the refrigeration is recovered from the residue gas. These operations may sometimes be advantageously carried out in separate pieces of apparatus.

The feed gas stream enters the lower section 7 at an intermediate level through pipe 10. The feed gas may be a natural gas composed primarily of methane, ethanes, propanes, butanes, pentanes and even higher molecular weight hydrocarbons. These terms are used broadly and should be interpreted as including the unsaturates as well as the branch chain isomers. It is contemplated that the method of separation may be employed in connection with gaseous mixtures of this character regardless of the source.

Each of the sections of tower 1 may be equipped with suitable conventional apparatus such as bubble trays, to effect intimate gas and liquid contact between downflowing liquids and upflowing gases. In section 7 a dehydrating liquid which may be any water avid liquid which is relatively non-volatile under the treating conditions and which preferably is non-corrosive may be employed. Ethylene glycol and propylene glycol are preferred for this operation but other organic materials as well as aqueous solutions of sugar, (sucrose, glucose or the like) or even inorganic materials such as, for example, lithium chloride may be employed. When used herein and in the claims ethylene glycol is to be interpreted as including mono, di, and tri ethylene glycol. The dehydrating liquid, due to its pre-chilling may be an aqueous solution of about 40 percent by weight, or even less, of the dehydrating agent and this greatly simplifies the regeneration or reconditioning of the spent dehydrating liquid as compared to conventional dehydrating systems employed for treating warm gases prior to chilling.

The liquid dehydrating agent is introduced into the upper portion of section 7 through line 11 and flows downwardly countercurrently of the upflowing gas. The liquid, as it enters section 7, is preferably cooled to a rather low temperature, as for instance in the order of 20° F., and serves as a refrigerant to cool the feed gas during the cold dehydration step. The temperature of the cold dehydrating liquid preferably should be low enough to cool the feed stream to the desired temperature for introduction into the absorption cycle. However, it is sometimes desirable to partially cool the gas by other means as, for example, by refrigeration of pressure reduction.

The dehydrating liquid accumulates in the lower end of tower 1 and is withdrawn through conduit 12 which is controlled by valve 13. This valve may be a solenoid valve or the like which acts in response to a float control 14 whereby a uniform liquid level may be maintained within the tower. The warm glycol may be conveyed by pipe 13 to the top of section 9 of the tower to recover refrigeration from the residue gas.

The residue gas or overhead product from the intermediate absorption portion 8 of the tower flows countercurrently to downflowing warm dehydrating liquid. This provides for recovery of the sensible refrigeration, from the residue gas, and also is somehat advantageous in partially dehumidifying the dehydrating liquid.

This recory of the refrigeration from the residue gas is not an essential part of the process, but is recommended in the interest of economy where the rehumidification of the residue gas is not objectionable. Where the residue gas is to be employed as fuel and is to be conveyed through pipe lines, this step is sometimes objectionable as the residue gas will tend to form objectionable hydrates in the pipe lines. However, for some uses, as for example in recycling installations, the formation of hydrates does not present much of a problem.

At the lower end of section 9 a reservoir 24 is provided for accumulating the dehydrating liquid, but this reservoir does not interfere with the passage of gas upwardly through the tower from section 8 into section 9. The accumulated liquid is withdrawn through conduit 15. This conduit connects to the suction of pump 16 and the discharge of the pump forces the dehydrating liquid through pipe 17 into chiller 4. A valve controlled branch line 16a may connect with line 15 for drawing off a portion of the dehydrating liquid for purposes of reconditioning. This line 16a connects with still 6 at an intermediate point and the still is equipped with a reboiler in the form of a heater which may be a steam coil 18. In the still, the excess water vapors are boiled out of the dehydrating liquid leaving the still as the overhead product and the reconditioned bottoms are withdrawn through valve controlled conduit 17a. The bottoms are forced by pump 19 into line 17 where they co-mingle with the main stream of the dehydrating liquid. Sufficient dehydrating liquid may be bypassed through the reconditioner to maintain a predetermined moisture content in the dehydrating liquid as it enters the lower section 7 of the absorber tower.

Chillers 3, 4 and 5 may be supplied with a refrigerant from a common source, not shown in the drawings, through line 20 and have refrigerant return lines 20a. Line 20 has a branch 20b connection with chiller 3 which has a float control expansion valve to maintain a predetermined condition within the chiller. The connection of line 20 with chiller 4 may also be similarly controlled. In the embodiment shown in the drawings, chiller 5 is supplied with refrigerant by line 21 communicating between shillers 4 and 5 and which is controlled in response to the conditions within chiller 5.

The dehydrating liquid is circulated through chiller 4 and passes through conduit 22 into chiller 5. Conduit 11 conveys the chilled dehydrated liquid to the dehydrating section of tower 1.

Referring to the absorption section or intermediate section 8 of tower 1, an absorbent menstruum which may be the usual lean oil, is introduced into the top of the section through conduit 23. Conduit 23 communicates with the discharge of chiller 3 so that the menstruum flowing downwardly through section 8 of the tower is cold and the residue gas leaving section 8 will have a considerable accumulated sensible refrigeration which may be recovered in section 9.

The oil flows downwardly in gas and liquid contact relation with the upcoming gas to dissolve the selected heavy constituents from the gas. The rich oil accumulates in a reservoir 24' which divides sections 7 and 8 of the tower. The reservoir 24' permits upward passing of gas between the two sections.

The accumulated rich oil is withdrawn from conduit 25, controlled by valve 26 in response to the liquid level within the reservoir because of float control 27. Line 25 discharges into an intermediate section of rectifier 2 where the rich oil is reconditioned to drive off dissolved selected heavy constituents of the gas through pipe 28. The gas is condensed and a portion of the condensate may be returned through line 29 as a reflux liquid. Heat for the rectifier may be supplied by a suitable heater such as a steam coil 30. The lean oil or reconditioned absorbent menstruum is withdrawn from tower 2 through discharge conduit 31 and is forced by pump 32 through conduit 33, the oil chiller 3 and into the absorption tower through conduit 33.

It is believed that the operation of the invention is apparent from the foregoing description. The feed gas stream enters the absorber through pipe 10 and flows countercurrently with the dehydrating liquid through section 7 of the tower. In this section the feed gas is both dehydrated and chilled in the single operation. The chilled dehydrated feed stream passes upwardly through the absorption section of the apparatus where the heavy consituents are removed by contact of the gas with the absorbent menstruum. The residue gas from the absorption section flows countercurrently in contact with downcoming warm dehydrating liquid. In this countercurrent flow the sensible refrigeration accumulated by the residue gas is recovered by the dehydrating liquid and at the same time the dehydrating liquid is partially reconditioned by giving up some of its dissolved water to the residue gas stream.

It is contemplated that in some instances it will be desirable to eliminate section 9 or its equivalent of the apparatus and method and to conduct the dehydrating liquid from the bottom of column 7 directly to the chillers except for the portion that is bypassed through the reconditioner.

It is believed that the objects of this invention have been accomplished. There has been provided an economical absorption process having utility in the separation of selected heavy constituents from a mixture of hydrocarbon gases. The method is such that the single contact of the feed stream with a cold dehydrating liquid both dehydrates and chills the gas feed stream, thus contributing to the economy and effectiveness of the subsequent absorption step. The method provides for the recovery of the sensible refrigeration of the residue gas by passing it in heat exchange relation with the dehydrating liquid withdrawn from the bottom of the dehydration section. This may be accomplished by direct gas and liquid contact in which case the dehydrated liquid will be partially dehumidified and thus partially reconditioned.

As a typical example of operation under this invention, involving the treatment of a natural gas where a water solution containing 40 percent by weight diethylene glycol constitutes the dehydrating and chilling liquid, gas is introduced through line 10 into the system at the rate of 223,550 pounds per hour, at a temperature of 95° F. Dehydrating and chilling liquid is circulated through the dehydrating section of the apparatus at the rate of 170,000 pounds per hour, entering the apparatus at 20° F. and leaving the bottom of the tower through conduit 12 at 85° F. The spent dehydrating liquid is introduced into section 9 of the tower at 85° F. and is withdrawn from reservoir 24 at 45° F. The absorbent menstruum employed is a hydrocarbon oil boiling within the range of kerosene and enters the absorption section of the tower at 20° F. and is withdrawn from this section at 30° F.

From the above example, it is apparent that the apparatus and method of this invention is particularly advantageous for treatment of a feed gas of high temperature where it is desirable to reduce the temperature of the gas before it enters the absorption section of the apparatus. A good deal of the sensible refrigeration is then recovered in the upper section of the tower where the dehydrating liquid is cooled from 85° F. down to 45° F.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described my invention, I claim:

1. The method of separating selected heavy constituents from a mixture of hydrocarbon gases comprising the steps of contacting a gas feed stream having a temperature higher than desired for a subsequent absorption step to which the stream is subjected with a cold dehydrating liquid in a contact zone to concomitantly dehydrate and chill the gas, contacting the chilled dehydrated gas with an absorbent menstruum in an absorption step to selectively absorb the desired heavy constituents and to produce a residue gas having a temperature below that of the dehydrating liquid after contacting the gas in said contact zone, rectifying the menstruum containing the absorbed hydrocarbons to recover same, and contacting the residue gas with the dehydrating liquid effluent from the dehydration step to partially recover the refrigeration from the residue gas and to remove a portion of the water from said dehydrating liquid.

2. The method of separating selected heavy constituents from a mixture of hydrocarbon gases having sufficient moisture therein to form a solid hydrate at a temperature at which the gases are to be contacted with an absorbent menstruum for said heavy constituents comprising the steps of continuously contacting a gas feed stream having a temperature higher than desired for a subsequent absorption step to which the stream is subjected with a cold dehydrating liquid to dehydrate and chill the gas stream, selectively absorbing the desired hydrocarbon constituents from the chilled dehydrated gas by contacting the chilled gas with an absorbent menstruum, the temperature of the absorbent menstruum being sufficiently low to produce a residue gas at a temperature below that of the dehydrating liquid after the latter has contacted the gas stream, contacting the residue gas from the absorption step with the liquid effluent stream from the dehydrating step to recover the refrigeration therefrom and to remove a portion of the water from said dehydrating liquid, and further cooling the resultant dehydrating liquid effluent stream before returning it to the dehydrating step.

3. The method of claim 2 wherein a portion of the dehydrating liquid effluent is withdrawn from the main stream thereof subsequent to the dehydration step and is dehydrated to a predetermined degree and recombined with the main stream thereof before it is reintroduced into the dehydration step, the amount of said portion being sufficient to maintain an operable degree of dehydration of the dehydrating liquid.

4. The method of claim 3 wherein ethylene glycol is the dehydrating liquid.

5. The method of selectively absorbing a heavy hydrocarbon from a hydrocarbon gas feed stream containing the same wherein said feed stream is to be subjected to absorption at a temperature below the hydrate formation point therefor which comprises first directly contacting said feed stream in a contact zone with a cold dehydrating liquid to concomitantly chill and dehydrate said stream, the temperature of the dehydrating liquid passing to said contact zone being below both that at which the gas feed stream is to be subjected to absorption and below the hydrate formation point of said gas feed stream, recovering the resulting chilled and dehydrated gas stream from said contact zone and passing it to an absorption zone, contacting the dehydrated and chilled gas in said absorption zone with an absorption menstruum to selectively absorb said heavy hydrocarbon and then in a separate step recovering the absorbed hydrocarbon.

6. The method of claim 5 wherein said dehydrating liquid is ethylene glycol.

7. The method of selectively absorbing a heavy hydrocarbon constituent from a hydrocarbon gas feed stream containing the same wherein said feed stream contains an undesirably high quantity of moisture and is at a temperature above that desired for the absorption step which comprises first intimately and directly contacting said gas feed stream in a chilling and dehydrating zone with a cold dehydrating liquid to concomitantly dehydrate and chill said gas stream, the temperature of the dehydrating liquid passing to said zone being sufficiently below that to which the gas is to be chilled that said gas is chilled to the desired low temperature, then passing the chilled dehydrated gas to an absorption zone and therein contacting it with an absorption menstruum to selectively absorb said heavy hydrocarbon constituent and recovering the absorbed hydrocarbon from said menstruum.

NELSON C. TURNER.

REFERENCES CITED

The following references are of record in the file of this patent:

UNITED STATES PATENTS

| Number | Name | Date |
| --- | --- | --- |
| 2,235,322 | Martin | Mar. 18, 1941 |
| 2,297,675 | Dayhuff et al. | Oct. 6, 1942 |
| 2,428,521 | Latchum Jr. | Oct. 7, 1947 |
| 2,437,288 | Anderson | Mar. 9, 1948 |